(No Model.) 2 Sheets—Sheet 1.
S. N. SMITH.
BALANCED EXPANSION JOINT FOR PRESSURE PIPES.
No. 575,577. Patented Jan. 19, 1897.
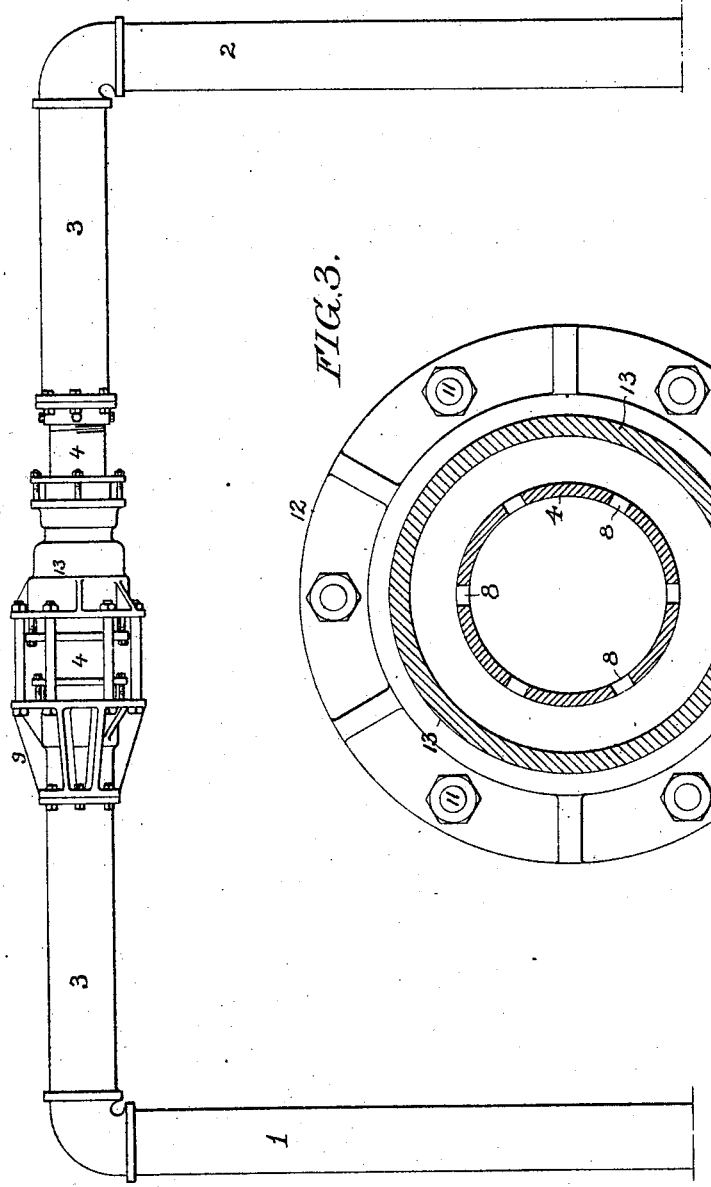
Witnesses
R. Schleicher
Frank E. Bechtold
Inventor:
Sommers N. Smith
by his Attorneys
Howson & Howson

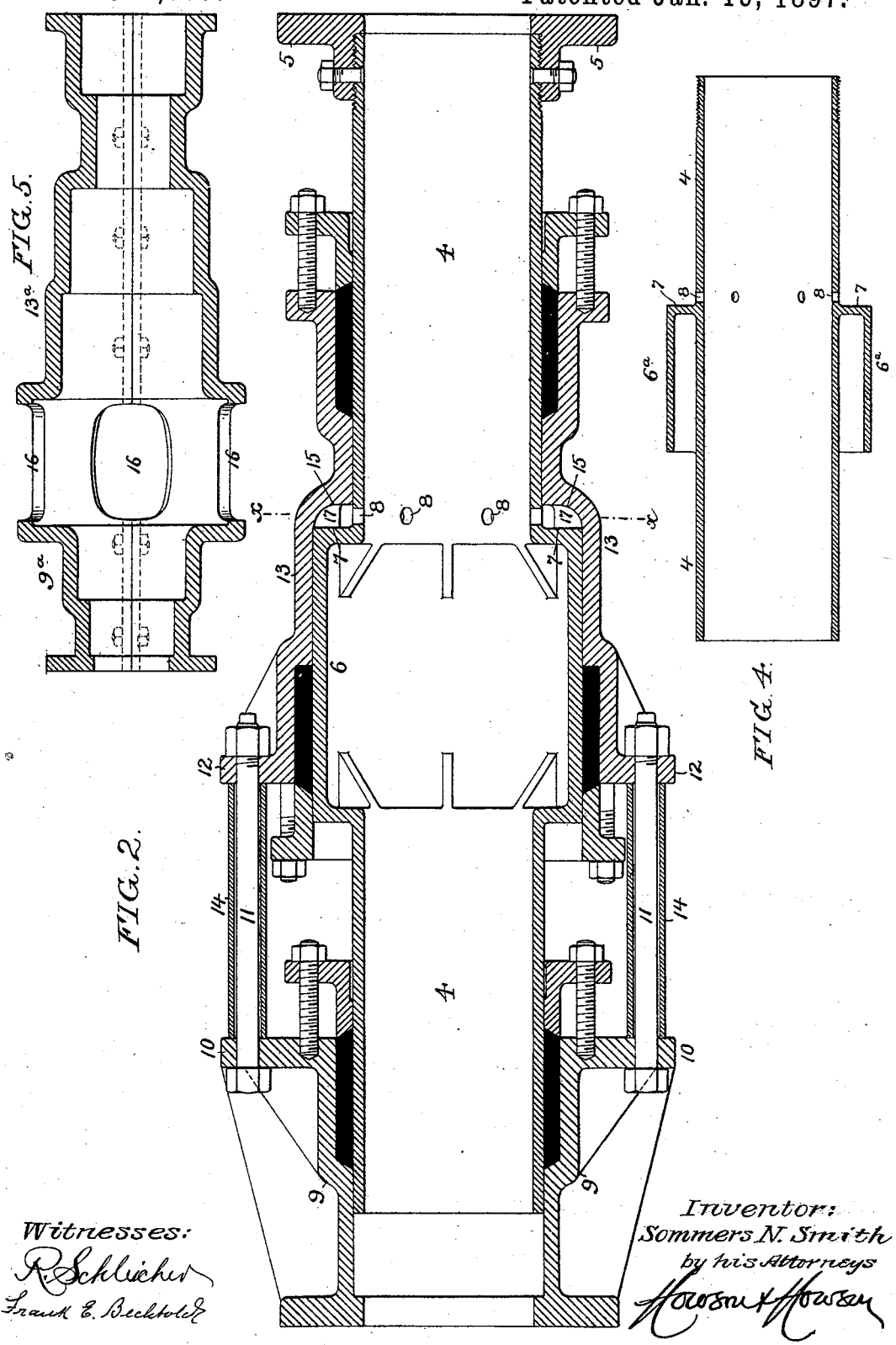

UNITED STATES PATENT OFFICE.

SOMMERS N. SMITH, OF NEWPORT NEWS, VIRGINIA.

BALANCED EXPANSION-JOINT FOR PRESSURE-PIPES.

SPECIFICATION forming part of Letters Patent No. 575,577, dated January 19, 1897.

Application filed April 1, 1896. Serial No. 585,809. (No model.)

*To all whom it may concern:*

Be it known that I, SOMMERS N. SMITH, a citizen of the United States, and a resident of Newport News, Warwick county, Virginia, have invented certain Improvements in Balanced Expansion-Joints for Pressure-Pipes, of which the following is a specification.

My invention relates to an expansion-joint for that class of steam or other pipes which are subjected to pressure tending to force the sections of the pipe apart longitudinally, the object of my invention being to so construct such a joint as to balance this pressure and permit the longitudinal movement necessitated by expansion, contraction, or other causes. This object I attain in the manner hereinafter set forth, reference being had to the accompanying drawings, in which—

Figure 1 is a view illustrating one mode of applying my improved joint. Fig. 2 is a sectional view, on a larger scale, of the joint structure. Fig. 3 is a transverse section on the line $x\ x$, Fig. 2; and Figs. 4 and 5 are sectional views, on a smaller scale, illustrating modifications.

In engineering, and especially in steam-engineering and shipwork, it frequently happens that pipes or other structures, such, for instance, as those represented at 1 and 2 in Fig. 1, have to be connected by another pipe, such, for instance, as represented at 3. Owing to the variations in temperature to which this pipe 3 is subjected, it must expand and contract, and it is therefore common to provide it with an expansion-joint which permits an end movement of the sections of the pipe from and toward each other. The connecting-pipe is therefore subjected to longitudinal pressure exerted throughout an area corresponding to that of the internal diameter of the pipe and tending to force the ends of the pipe apart. Hence it becomes necessary to brace the end pipes 1 and 2 or other connected structures in order to resist this tendency. In many cases, however, the use of struts, braces, or abutments for the purpose is inconvenient, if not impracticable, and it is therefore advisable to provide the connecting-pipe with a balanced expansion-joint, that is to say, a joint which will provide for the neutralization of the longitudinal pressure.

My invention has for its object the provision of such a balanced expansion-joint.

The construction which I have adopted will be understood on reference to Figs. 2 and 3, in which 4 represents a tube having at one end a flange 5 or other structural formation whereby it can be conveniently attached to one section of the pipe 3 or to the elbow-coupling of one of the end pipes, say, for instance, the pipe 2. This tube 4 has a portion 6 of enlarged diameter, so as to form an external annular shoulder 7, adjacent to which the tube has an opening or series of openings 8, as shown in Figs. 2 and 3.

On that end of the tube 4 opposite to the end carrying the flange 5 is fitted a sleeve 9, which is flanged or otherwise constructed at its outer end for attachment to a section of the pipe 3 or to the elbow-coupling of the end pipe 1, this sleeve 9 having a suitable stuffing-box at its inner end, so that any leakage of steam between the same and the tube 4 is effectually prevented.

On the inner end of the sleeve 9 is formed an annular flange 10, which is connected by bolts 11 to a flange 12 on a sleeve 13, suitable filling-pieces being interposed between the flanges 10 and 12, in order to retain the sleeves 9 and 13 rigidly in their proper longitudinal relation, these filling-pieces being preferably in the form of tubes 14, surrounding the bolts 11.

The sleeve 13 comprises two portions, of different diameters, the portion of smaller diameter fitting upon the tube 4 and having a stuffing-box to prevent leakage between it and said tube, while the portion of larger diameter fits upon the enlarged portion 6 of said tube 4 and is likewise provided with a stuffing-box to prevent leakage. This enlargement in the diameter of the sleeve 13 provides an internal shoulder 15, facing the shoulder 7 of the tube 4, so that between these two shoulders an annular chamber is formed to which steam has free access through the openings 8. Steam in this chamber consequently tends to force the tube 4 and sleeve 13 in opposite directions, and as said tube carries one of the pipe connections of the joint and the sleeve 9, which is rigidly secured to the sleeve 13, carries the other of said pipe connections it follows that if the shoulders 7 and 15 are properly proportioned the pressure upon the sections of the pipe 3, tending to force them longitudinally apart, will be counterbalanced, and the pipe or the parts to which it is connected will be relieved from the strain which would otherwise be due to such pressure, while at the same time the desired end movement of the sections of the pipe 3, due to expansion, contraction, or other causes, will be permitted without bringing any strain upon the pipes 1 and 2 or other end connections.

The enlarged portion of the sleeve 13 has a series of internal ribs 17, which limit the approach of the shoulders 7 and 15, and thus prevent the sleeve 13 from closing the openings 8. Hence the chamber between the said shoulders 7 and 15 is always open to pressure.

The putting together and taking apart of my improved expansion-joint can be readily effected, as all of the stuffing-boxes, as well as the connections between the sleeves 9 and 13, are external and readily accessible.

Each of the sleeves 9 and 13 may be in one piece, as shown, or said sleeves may be divided transversely and the sections bolted together, as may be found most convenient, and, if desired, the enlarged portion of the tube 4 may be in the form of an annular flange on said tube, as shown, for instance, at 6ª in Fig. 4.

When the sleeves are divided transversely, the corresponding sections of the sleeves may be connected, so as to form a single structure, as shown, for instance, at 9ª 13ª in Fig. 5, the connecting structure having openings formed in it, as at 16, to permit access to the bolts which confine the stuffing-box followers of the two sleeves.

Having thus described my invention, I claim and desire to secure by Letters Patent—

1. The within-described balanced expansion-joint for pressure-pipes, said joint consisting of a tube having an enlarged portion forming an external annular shoulder, a sleeve encircling said tube and having an internal shoulder opposed to that of the tube and forming therewith a chamber open to the pressure within the pipes, a second sleeve encircling the tube beyond the shouldered portion, means for connecting the two sleeves, and external, exposed stuffing-boxes whereby tight joints are formed between the sleeves and the tube upon which they are mounted, substantially as specified.

2. The within-described balanced expansion-joint for pressure-pipes, said joint consisting of a tube having an enlarged portion forming an external annular shoulder, a sleeve encircling said tube and having an internal shoulder opposed to that of the tube and forming therewith a chamber open to the pressure within the pipes, a second sleeve encircling the tube beyond the shouldered portion, bolts connecting flanges on the two sleeves, and external, exposed stuffing-boxes whereby tight joints are formed between the sleeves and the tube, substantially as specified.

3. The within-described balanced expansion-joint for pressure-pipes, said joint consisting of a tube having an enlarged portion forming an external annular shoulder, a sleeve encircling said tube and having an internal shoulder opposed to that of the tube and forming therewith a chamber open to the pressure within the pipes, a second sleeve encircling the tube beyond the shouldered portion, bolts connecting flanges on the two sleeves, distance-pieces interposed between the two flanges, and stuffing-boxes whereby tight joints are formed between the sleeves and the tube, substantially as specified.

4. The within-described balanced expansion-joint for pressure-pipes, said joint comprising a tube connected to one section of the pressure-pipe and having an external annular shoulder and perforations adjacent thereto, an encircling sleeve connected to the opposite section of the pressure-pipe and having an internal shoulder whereby opposed annular counterbalancing surfaces are presented, and stops to limit the approach of the shoulders and prevent closing of the perforations of the tube, substantially as specified.

In testimony whereof I have signed my name to this specification in the presence of two subscribing witnesses.

SOMMERS N. SMITH.

Witnesses:
 WILL. A. BARR,
 JOS. H. KLEIN.